Sept. 2, 1924.  J. V. CONOVER  1,507,467
CHART
Filed Feb. 2, 1923  2 Sheets-Sheet 1
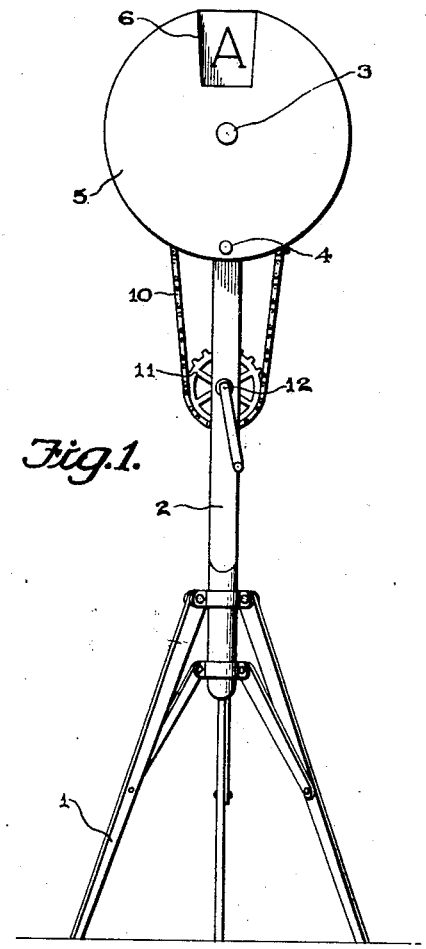
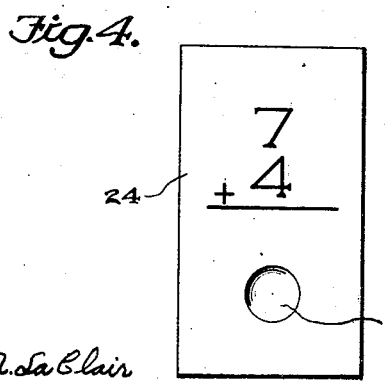
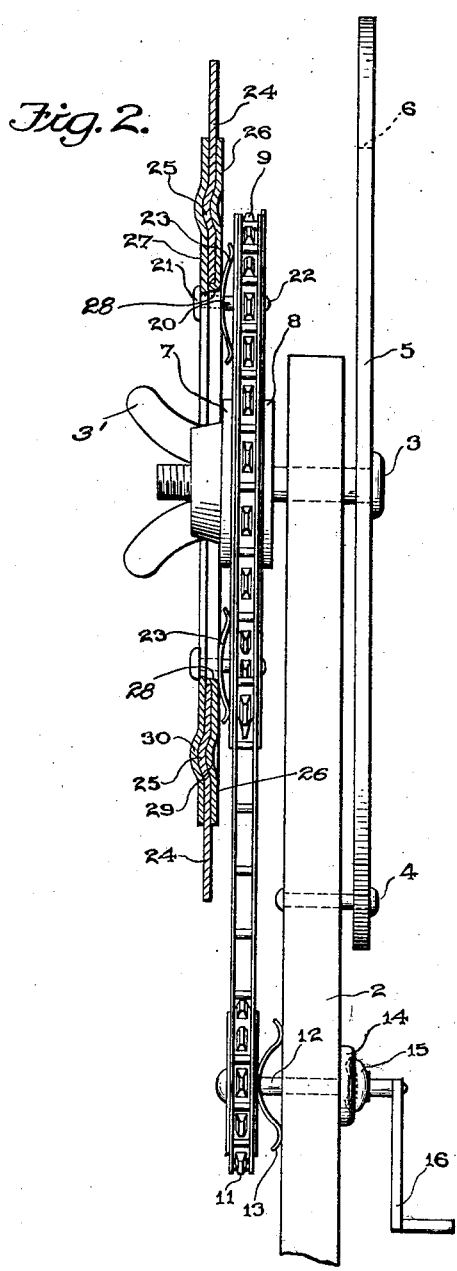
James Victor Conover
INVENTOR Sept. 2, 1924.
J. V. CONOVER
CHART
Filed Feb. 2, 1923
1,507,467
2 Sheets-Sheet 2
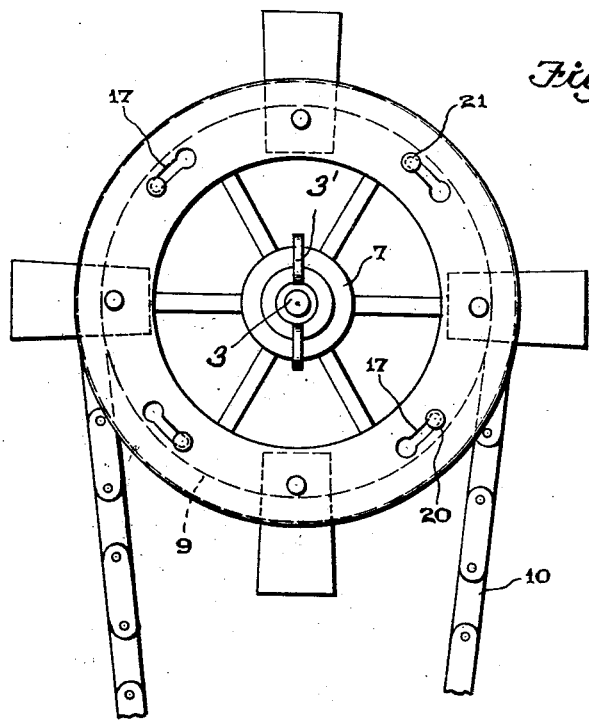
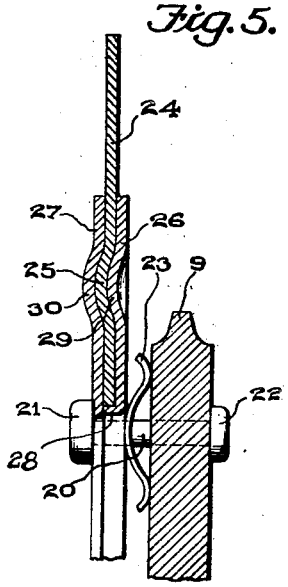
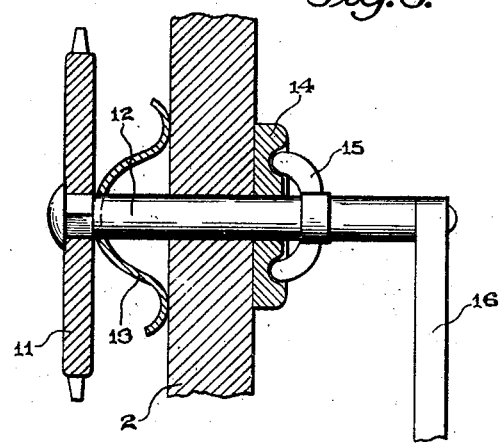
James Victor Conover
INVENTOR
BY *Victor J. Evans*
ATTORNEY
*H. A. La Clair*
WITNESS:

Patented Sept. 2, 1924.

1,507,467

UNITED STATES PATENT OFFICE.

JAMES VICTOR CONOVER, OF PAOLI, OKLAHOMA.

CHART.

Application filed February 2, 1923. Serial No. 616,627.

*To all whom it may concern:*

Be it known that I, JAMES VICTOR CONOVER, a citizen of the United States, residing at Paoli, in the county of Garvin and State of Oklahoma, have invented new and useful Improvements in Charts, of which the following is a specification.

My present invention has reference to an educational chart.

My object is to produce a mechanical chart for schools by the use of which certain problems relating to any of the school studies may be brought successively to view by the students.

A further object is to produce an educational chart in which the base is preferably in the nature of a tripod and which has secured to its upper end a disk provided with a notch, while arranged at the rear of the disk in a position to be successively displayed through the notch thereof there are cards having suitable indicia thereon, means at the front of the disk being provided for successively revolving mechanism to bring the separate cards opposite the notch of the disk, and means being provided for holding the cards when so positioned.

To the attainment of the foregoing and many other objects which will present themselves as the nature of the invention is better understood, reference is to be had to the drawings which accompany and which form part of this application.

In the drawings:—

Figure 1 is a front elevation of an educational chart in accordance with this invention.

Figure 2 is a greatly enlarged side elevation of the upper portion of the improvement.

Figure 3 is a rear elevation of the construction disclosed in Figure 2.

Figure 4 is a plan view of one of the cards.

Figure 5 is an enlarged edge view, with parts in section, illustrating the manner in which a card is held between plates that are removably secured to the upper cog wheel.

Figure 6 is a view of the clutch for holding the cards positioned opposite the notch in the disk.

In the showing of the drawings I have mounted my improvement upon a tripod, but it is to be understood that other supports therefor may be successfully employed. The legs of the tripod are indicated in the drawings by the numeral 1, and the standard thereof by the numeral 2. The standard, in the present instance has fixed thereto by means 3 and 4, a disk 5. The disk has a central substantially rectangular notch or opening 6 at its upper edge, the same providing a sight opening for cards having mathematical or other problems inscribed thereon and which will be referred to hereinafter in detail.

Both of the elements 3 and 4 are preferably removably connected to the standard 2, by means which are preferably in the nature of bolts which are engaged by nuts, but the bolt 3 is of a greater diameter and a greater length than the bolt 4. The bolt 3 has arranged thereon spaced disks 7 and 8, a wing nut 3' being screwed on the bolt and contacting with the outer disk 7. On the bolt between the disks there is a cog wheel 9 around which is trained an endless chain 10 that is also trained around a smaller cog wheel 11 that has its shaft 12 journaled in a bearing opening in the standard 2. Between the inner face of the standard and the cog wheel 11 there is an arched spring 13, the said spring being centrally provided with an opening through which the shaft 12 passes.

Surrounding the shaft 12, and secured on the outer face of the standard 2 there is a disk 14 having a circumferential depression for the reception of rounded clutch teeth on a clutch member 15 that is fixed on the shaft 12. The outer end of the shaft 12 is provided with an angle handle 16 whereby both of the cog wheels may be revolved.

The cog wheel 9 has passed through its rim, at equidistantly spaced points cross sectionally rounded members 20, the same having their ends provided with heads 21 and 22 respectively. The heads 21 project from the rear face of the wheel 9. Preferably the members 20 are rigidly secured to the wheel, and each member passes through a central slot or opening in an arched spring 23, the ends of the spring being rounded and being in contact with the rear face of the rim of the wheel 9.

The numeral 24 designates one of the cards employed, and by reference to Figures 2, 4 and 5 it will be seen that each card 24, below the problem imprinted thereon has a depression 25 entering from the outer face of said cards.

The holding means for the cards 24 are in the nature of inner and outer ring members 26 and 27 respectively, the inner ring member 26 preferably having its inner periphery flanged, as at 28 in the direction of the outer or rear ring member 27. The ring members 26 and 27 have their flat body portions provided with depressions 29 and 30 providing therebetween what may be termed a tongue and a groove to receive therebetween the cross sectionally rounded depressed portion 25 of each card 24, the inner edges of the card resting on the flange 28. The rings are provided each with key-hole slots 30 designed to register when the rings are assembled, and the cards are arranged therebetween. The larger passages provided by the key-hole slots are designed to receive therethrough the heads 21 of the members 20 and when the rings and cards are bodily turned on the members 20 the said members enter the restricted passages of the key-hole slots, the springs 23 contacting with the inner ring member 26 forces the latter toward the outer or rear ring member 27, and tightly compresses the cards between the ring holders therefor. The ratio of the cog wheels 9 and 11 is approximately 4 to 1. There are four cards carried by the wheel 9. Thus each complete revolution of the wheel 11 will cause the wheel 9 to turn one-fourth of a revolution so that each successive turning of the wheel 11 will bring one of the cards opposite the sight opening or notch 6 in the disk 5. In operation the teacher grasps the crank handle 16 and exerts a slight pull on the shaft 12 so that the clutch fingers of the element 15 will be brought out of contact with the wall of the groove in the disk 14. The friction exerted between the arched spring 13 and the cog wheel 11 will tend to retard the turning of the shaft 12 so that the operator will have ample time to observe the position of the cards with respect to the sight opening or notch 6 in the disk 5. When a card bearing a desired problem is brought opposite the disk, pressure on the crank handle 16 is released so that the spring 13 will expand and automatically move the shaft 12 to bring the clutch element 15 in the groove of the disk 14. The inner wall provided by the groove in the disk 14 may be notched at determined intervals so that the fingers of the clutch element 15 will ratchet over said notches until the proper card is brought opposite the sight opening or notch.

My improvement is preferably of a portable nature, as disclosed by the drawings and should prove an attractive means for teaching various school problems to pupils. The construction is comparatively simple, and while I have illustrated and described a satisfactory embodiment of the invention, it is to be understood that I am entitled to make all such changes therefrom as fall within the scope of what I claim without departing from the spirit of my invention.

Having described the invention, I claim:—

1. In an educational chart, a support, a member having a sight opening fixed thereto, a wheel journaled on the support, to the rear of the member, a pair of ring members, cards bearing educational problems positioned between said rings, means for removably securing the rings and cards to the wheel, means between the wheel and one of the rings for causing the latter to exert a pressure toward the other ring to bind the card therebetween, means for revolving the wheel to bring the cards successively to view through the sight opening, and means for locking the wheel to hold the same from movement when the cards are so positioned.

2. In an educational chart, a tripodal support, a member fixed thereon having a sight opening, a shaft carried by the member and support, a wheel loosely and removably arranged on the shaft, said wheel having its rim provided with headed members, a pair of flat ring members, cards having educational problems thereon disposed between the ring members, interengaging means between the rings and cards, said rings having key-hole slots to receive therethrough the headed members of the wheel, spring means between the wheel and ring members adjacent thereto for forcing the ring members toward each other to clamp the cards therebetween, means for revolving the wheel to bring the cards successively opposite the sight opening in the member, and means for locking the wheel when the card is so positioned.

3. In an educational chart, a tripodal support, a notched disk fixed thereto, a shaft passing through the disk and through the support, a sprocket wheel freely mounted on the shaft, said sprocket wheel having headed studs, cards bearing educational problems and having depressed portions, a holder for said cards comprising a pair of flat ring members, one of which having its inner periphery flanged and both of which having depressions forming therebetween tongues and grooves to engage with the walls provided by the depressions in the cards, said rings having bayonet aligning slots to receive therethrough the headed studs, arched springs on said studs exerting a tension between the sprocket wheel and the ring member adjacent thereto for compressing the cards between both of the ring members, a spring influenced shaft journalled below the first mentioned shaft, a sprocket wheel thereon, an operating handle for the shaft, clutch means between the handle and the support for the shaft, spring means influencing said clutch means into clutching position, and a chain trained around the sprocket wheels, for the purpose set forth.

In testimony whereof I affix my signature.

JAMES VICTOR CONOVER.